United States Patent Office 2,999,805
Patented Sept. 12, 1961

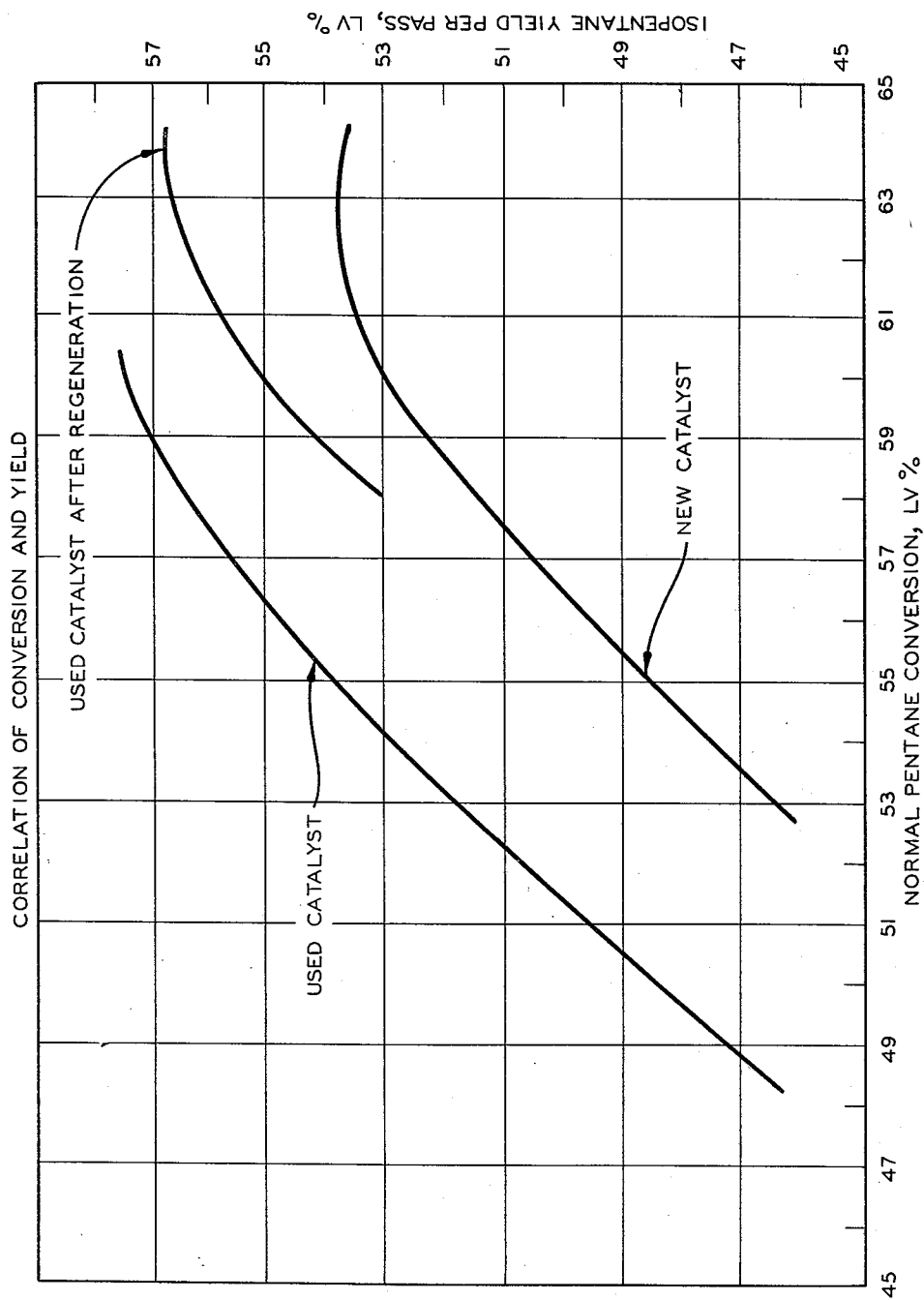

2,999,805
PARAFFIN ISOMERIZATION PROCESS
John W. Myers, Bartlesville, Okla., assignor to Phillips Petroleum Company, a corporation of Delaware
Filed July 3, 1957, Ser. No. 669,797
9 Claims. (Cl. 208—140)

This invention relates to an improved process for isomerizing an isomerizable paraffin hydrocarbon.

Platinum-alumina type catalysts are used commercially in the reforming of naphtha hydrocarbons and have a relatively long life in this type of process before regeneration or replacement is required. This invention is based upon the discovery that a platinum-alumina type reforming catalyst which has been used until its activity for reforming is substantially reduced and contains a substantial coke deposit, such as in the range of 0.3 to 3 weight percent of the catalyst, has high activity for the isomerization of isomerizable paraffin hydrocarbons and in fact effects greater efficiency in an isomerization process than the original, unused catalyst without coke deposit. The isomerization is carried out in the presence of added hydrogen. The specific improvement of this invention comprises carrying out the isomerization reaction in the presence of a catalyst of the platinum-alumina type, preferably halogenated, having a substantial carbonaceous deposit thereon, usually in the range of 0.3 to 3 weight percent of the catalyst. The carbonaceous deposit may be put on the catalyst by operating it in an initial coke-depositing operation specifically for depositing the coke, or a used unregenerated reforming catalyst of this type can be used.

The initial coke-depositing period may be a period of low-hydrogen operation in the isomerization run, a low-hydrogen period of reforming a light naphtha, a period of reforming a heavy naphtha having an end point above about 425 F., or other similar type of operation. A preferred operation, however, is to conduct a conventional reforming operation until the catalyst drops in activity to a point at which the catalyst would ordinarily be replaced, or at least regenerated, and thereafter use the catalyst in the isomerization of a paraffin hydrocarbon. Thus, the full use of the reforming activity of catalyst is used; and the resulting high isomerization activity of the catalyst can then be utilized.

The hydrocarbons ordinarily isomerized are n-butane, n-pentane and/or n-hexane, with branched chain paraffins being produced. The conditions for the isomerization reaction are 100 to 1000 p.s.i., preferably 200 to 500 p.s.i.; 750 F. to 900 F., preferably 790 F. to 850 F.; and hydrogen-to-hydrocarbon mol ratio in the range of 1 to 1 up to 10 to 1, preferably from 2 to 1 up to 4 to 1.

As pointed out before, it is preferred to utilize the initial reforming activity of new catalyst in a naphtha reforming operation before using the catalyst in isomerization. This method of operation is ordinarily the most economical in that the largest amount of hydrocarbon is upgraded before the catalyst is changed or regenerated. Numerous specific modifications of flow are possible under this general mode of operation. For example, in a five-chamber system, chambers 1, 2 and 3 (series flow) can be in reforming service with 1 being the oldest and 3 the freshest catalyst; chamber 4 contains fresh or regenerated catalyst; and chamber 5 is in isomerization service following removal from reforming service. As the reforming activity of chamber 1 falls to the point at which it is removed from that service, it is replaced in this service by chamber 4, the reforming reaction flow then being through chambers 2, 3, and 4 in that order. Chamber 1 is placed in service on isomerization, and the catalyst in chamber 5 is replaced or regenerated.

In at least a large number of platinum catalyst units, the catalyst life is long enough that the catalyst is replaced with fresh catalyst rather than being regenerated. However, regeneration can be and is used. When regeneration is practiced, the regenerated catalyst is used in this system in the same manner as new catalyst, a carbonaceous deposit being accumulated on it before use in isomerization, use in reforming being the preferred way to accumulate the deposit.

The preferred reforming catalyst for this process is that disclosed in U.S. Patent 2,659,692 to Haensel et al. and comprises a minor amount of platinum and of a halogen (fluorine or chlorine) in admixture with alumina. The platinum content is usually within the range of 0.05 to 5.0 weight percent and the amount of combined halogen in the catalyst is in the range of about 0.1 to 8.0 weight percent. The catalyst may also contain silica, boria, and/or zirconia. The halogen may be omitted but its presence in the catalyst in minor amounts is preferred.

The following specific example is illustrative of the invention and is not to be construed as imposing unnecessary limitations thereon.

Example

Three platinum-halogen-alumina catalysts were used to isomerize normal pentane under process conditions comprising a pressure of 300 p.s.i.g., a LHSV of three, a hydrogen to pentane mol ratio of three, and varied isomerizing temperatures to give different conversion levels. The first catalyst was a new unused commercial platinum reforming catalyst. The second catalyst was originally the same as the first but had been used for about 11 months in reforming 200 to 400 F. naphtha. At this time the reforming activity had decreased to the extent that it was undesirable to use it any longer for the reforming of naphtha.

A third catalyst was obtained by taking the second catalyst (used for 11 months in reforming naphtha) and regenerating the same with air-$N_2$. In other words this third catalyst was a regenerated, used reforming catalyst suitable for reuse in reforming of naphtha.

The data from the runs are correlated and shown in the drawing which is a graph of the curves plotted from the data. It is readily apparent that unregenerated, used catalyst gives the highest yield of isopentane at a given conversion level and, therefore, is the most efficient of the three catalysts.

Certain modifications of the invention will become apparent to those skilled in the art and the illustrative details disclosed are not be construed as imposing unnecessary limitations on the invention.

I claim:

1. A process for isomerizing an isomerizable paraffin hydrocarbon which comprises initially contacting said hydrocarbon admixed with $H_2$ under isomerizing conditions with a platinum-alumina catalyst previously used in a process of reforming of a hydrocarbon feed different than aforesaid hydrocarbon and comprising naphtha until said catalyst is substantially completely deactivated as to the reforming process and has deposited thereon all of the carbonaceous material accumulated during said reforming, so as to form isomeric hydrocarbon.

2. The process of claim 1 wherein said catalyst contains a minor but effective amount of a halogen of the group fluorine and chlorine.

3. The process of claim 1 wherein said deposit is produced by utilizing said catalyst in the reforming of a naphtha fraction.

4. The process of claim 1 wherein said catalyst is one of the group platinum-halogen-alumina, platinum-silica-alumina, platinum-boria-alumina, platinum-zirconia-alumina, and platinum-acid-treated-alumina.

5. The process of claim 1 wherein said paraffin contains from 4 to 8 carbon atoms per molecule.

6. A process comprising reforming a naphtha fraction under reforming conditions in contact with a platinum-halogen-alumina catalyst; continuing said contacting until the coke deposit on said catalyst is in the range of 0.3 to 3 weight percent of the catalyst and its activity for reforming is too low for further reforming; thereafter contacting said catalyst in unregenerated condition containing said coke deposit under isomerizing conditions with a stream consisting essentially of isomerizable paraffin hydrocarbon of 4 to 8 carbon atoms per molecule admixed with $H_2$ so as to produce isomeric hydrocarbon with greater efficiency than would be obtained by regenerating said catalyst and using same in the isomerization step.

7. The process of claim 6 wherein said paraffin comprises n-butane.

8. The process of claim 6 wherein said paraffin comprises n-pentane.

9. The process of claim 6 wherein said paraffin comprises n-hexane.

References Cited in the file of this patent

UNITED STATES PATENTS

| | | |
|---|---|---|
| 2,668,790 | Good et al. | Feb. 9, 1954 |
| 2,723,946 | Donaldson | Nov. 15, 1955 |
| 2,758,063 | MacLaren et al. | Aug. 7, 1956 |
| 2,765,262 | Weikart | Oct. 2, 1956 |
| 2,798,105 | Heinemann et al. | July 2, 1957 |
| 2,834,823 | Patton | May 13, 1958 |
| 2,868,718 | Johnston | Jan. 13, 1959 |